C. MACBETH AND E. SULLIVAN.
APPARATUS FOR APPLYING HARD RUBBER TO TIRE FOUNDATION BANDS.
APPLICATION FILED MAR. 25, 1919.
1,330,886.
Patented Feb. 17, 1920.
2 SHEETS—SHEET 1.
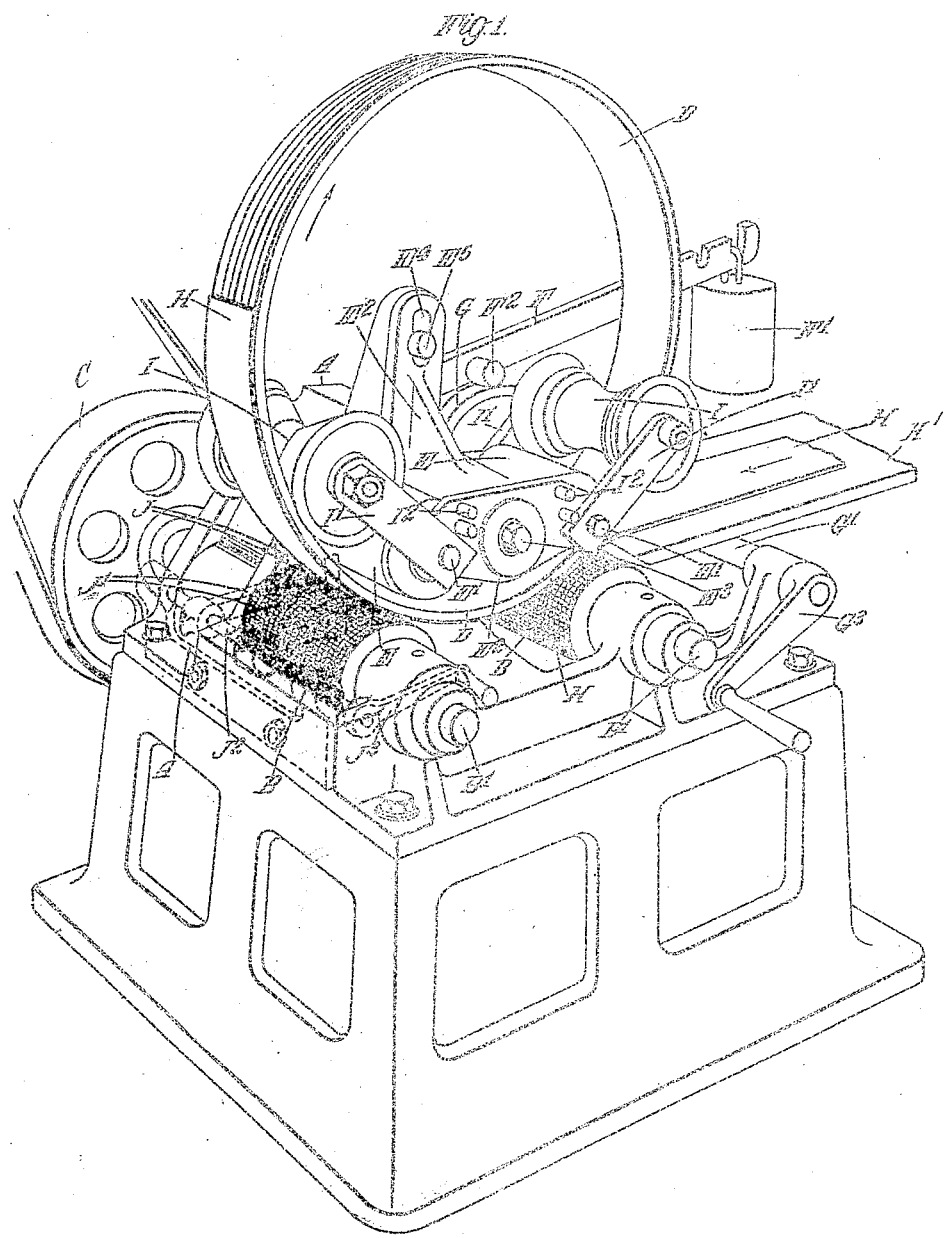

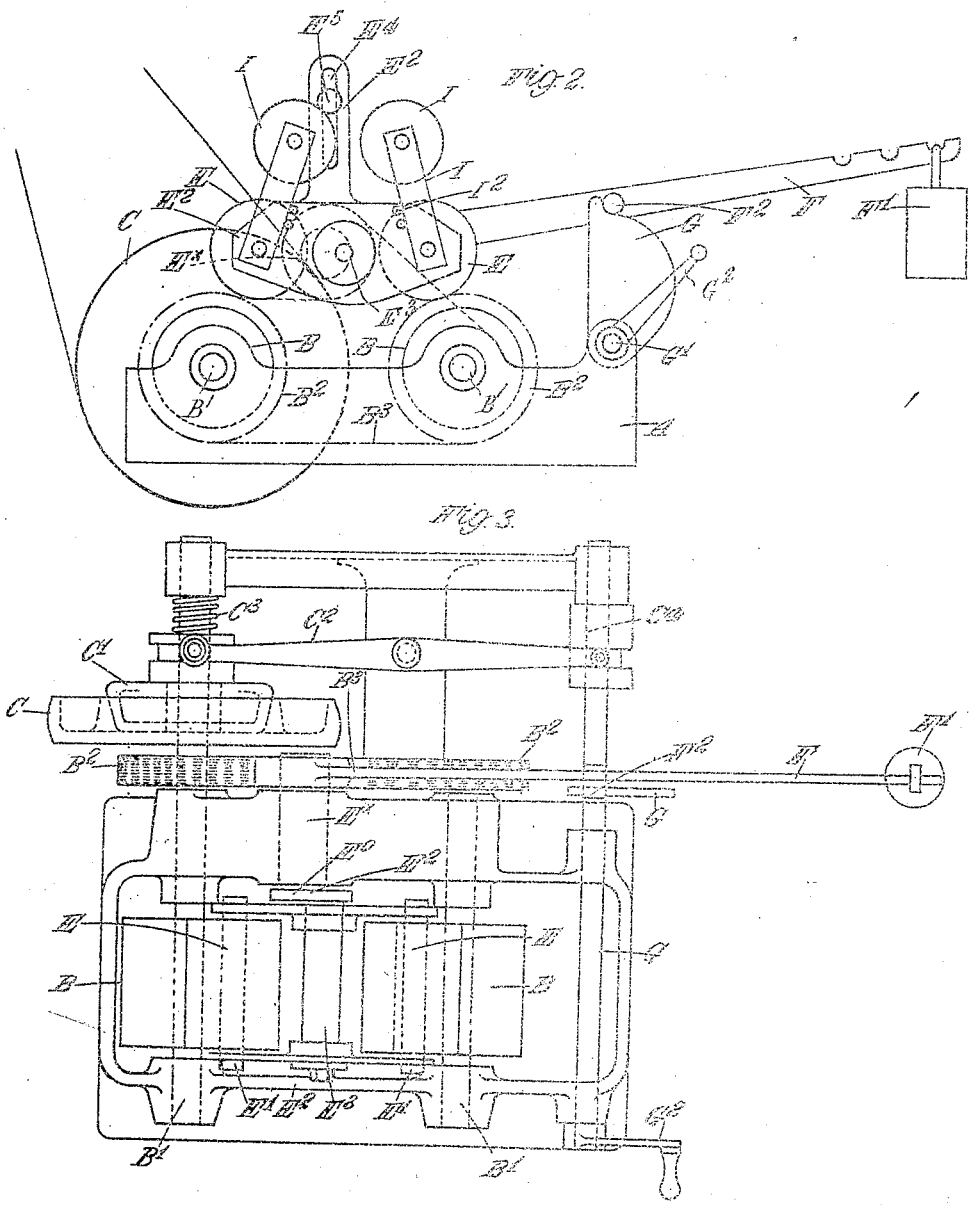

UNITED STATES PATENT OFFICE.

COLIN MACBETH AND ERNEST SULLIVAN, OF BIRMINGHAM, ENGLAND, ASSIGNORS TO THE DUNLOP RUBBER COMPANY, LIMITED, OF WESTMINSTER, LONDON, ENGLAND.

APPARATUS FOR APPLYING HARD RUBBER TO TIRE FOUNDATION-BANDS.

1,330,886.  Specification of Letters Patent.  Patented Feb. 17, 1920.

Application filed March 25, 1919. Serial No. 284,956.

*To all whom it may concern:*

Be it known that we, COLIN MACBETH and ERNEST SULLIVAN, both subjects of the King of Great Britain, residing at Para Mills, Aston Cross, Birmingham, in the county of Warwick, England, have invented certain new and useful Apparatus for Applying Hard Rubber to Tire Foundation-Bands, of which the following is a specification.

This invention relates to the manufacture of solid rubber tires. Solid rubber tires usually comprise a steel foundation band which is grooved or otherwise formed on its outer surface to which is vulcanized a hard rubber or vulcanite strip on which the resilient portion or tread of the tire is vulcanized. It has been proposed to apply the hard rubber strip to the foundation band by passing the strip between the outer surface of the band and two rollers supporting the band while a pressure roller bears upon the inner surface of the band at a point between the two supporting rollers for causing the hard rubber to adhere to the band. In this arrangement the application of the pressure at a point between the points of support is likely to cause distortion of the band and may as a result cause imperfect adhesion between the strip and the band.

According to this invention the pressure for causing the hard rubber to adhere to the band is applied on the inner surface of the band at points coincident with or adjacent to the points of support afforded by the supporting rollers. For this purpose we may provide, in the case of two supporting rollers, two pressure rollers situated within the band which bear upon the inner surface of the latter at points coincident with or adjacent to the points of support. The pressure applied in this manner is therefore not liable to distort the band and by means of this arrangement, a satisfactory adhesion of the strip to the band can be obtained. We also provide means for moving the pressure rollers into and out of contact with the inner surface of the band and means whereby the supporting rollers which are driven by suitable gearing to rotate the band, are unclutched from the driving gearing prior to the moving of the pressure rollers out of contact with the band, so as to avoid or prevent the liability of air being trapped between the band and the strip as might occur if the pressure were removed too soon.

Means are also provided for guiding or correctly supporting the band and such means may comprise for example flanged guide rollers bearing against the inner surface of the band, the flanges on the rollers lying adjacent to the sides of the band and thus insuring that the band is correctly supported and that the strip is correctly positioned on the band. Suitable means may also be provided for trimming the edges of the strip during its application to the band.

In order that the said invention may be clearly understood and readily carried into effect, we will describe the same more fully with reference to the accompanying drawings in which:—

Figure 1 is a perspective view illustrating generally one construction of the improved apparatus.

Figs. 2 and 3 are respectively a front view and a plan showing more particularly the means for moving the supporting rollers into and out of contact with the inner surface of the band and the means for rotating the supporting rollers.

A represents the base or main frame of the machine or apparatus. B, B represent the supporting rollers which are knurled on their outer surfaces and are secured on shafts B′ mounted in bearings in the frame A, and adapted to be rotated by means of a suitably driven pulley C disposed at the rear of the apparatus on one of the shafts B′ which shaft has a friction or other gear wheel B² (see Figs. 2 and 3) operatively connected by a belt or chain B³ to a similar gear wheel B² on the other shaft so that when the pulley C is clutched to the shaft B′ as hereinafter described, rotation can be imparted to both the shafts B′ and their rollers B in the same direction. D is the foundation band which may be grooved or otherwise formed on its exterior surface and which is supported vertically by its lower part resting upon the two supporting rollers B, B, the band being rotated by the rotation imparted to the supporting rollers B, B and their shafts B′, B′. E, E represent the two pressure rollers disposed within the band D and rotatably mounted on pins E′ fixed in a frame E² which is supported or mounted on a crank pin E³ medially placed between the two pressure rollers E, E and connected by a crank E⁰ to a crank shaft E× suitably supported in the frame A (see Figs.

2 and 3). Connected or keyed to the crank-shaft E$^x$ is one end of a lever or arm F adapted to be weighted at its other and free end as required by a movable weight F', the position of the lever or arm F being controlled or determined by means of an adjustable cam G adapted to engage with a projection F$^2$ on the lever F so that the lever may be set to a position in which its weight causes the crank E$^0$ to move and force the frame E$^2$ downwardly so that the pressure rollers are forced or pressed into contact with the inner surface of the band. The cam G can also be set to raise the weighted lever which through the crank connection raises the frame E$^2$ so that the pressure rollers are moved out of contact with the inner surface of the band, Fig. 2 indicates the parts in this position. In order to effect these adjustments, the cam G is secured on one end of a shaft G' having at its other end a crank handle G$^2$ by means of which the cam can be angularly moved in one direction or the other to raise or lower the lever and thus move the pressure rollers out of or into contact with the inner surface of the band. The vulcanite or hard rubber strip H is supported and guided along a table H' so as to pass between the exterior surface of the band and the supporting or driving rollers B, the rotation of which latter causes the band D with the strip H adhering thereto to rotate, the necessary pressure for effecting adhesion of the strip H to the band D being applied by the pressure rollers B, B when acted upon by the weighted lever F. The rotation of the band D and the application of the strip H thereto in the manner aforesaid continues until the band D is completely encircled by the strip H. The pressure exerted by the rollers can be removed by actuating the cam G as aforesaid so as to raise the lever and the frame E$^2$ carrying the pressure rollers. In order to insure that the pressure rollers E, E shall not be raised prior to the stopping of the rotation of the band D, a suitable clutch C' is provided which is adapted to engage with the pulley C and to be actuated by a pivoted lever C$^2$ operated against the action of a spring C$^3$ by a cam device C$^4$ on the shaft G' when the latter is angularly moved by the handle G$^2$. The arrangement is such that before the cam G is moved by the turning of its shaft G' to raise the weighted lever F, the pivoted lever C$^2$ is actuated by the cam device C$^4$ to move the clutch C' out of engagement with the aforesaid pulley C so that the shafts B' and their rollers B no longer rotate. The continued operation of the handle G$^2$ eventually causes the cam G to move the weighted lever F and raise the pressure rollers as aforesaid. By means of this arrangement the rotation of the band D can be stopped at any time during the application of the strip thereto, and as the pressure is not removed until after the stoppage of rotation, the liability of air being trapped between the band and the strip (as might occur if the pressure were removed too soon) is prevented. The frame E$^2$ supporting the pressure rollers is provided with a slot E$^4$ in which the pin E$^5$ fixed on part of the frame A projects so as to allow for the necessary up and down movement of the frame but to prevent undue tilting of the frame about its crank or supporting pin. The frame E$^2$ may carry two flanged guide rollers I by means of pivoted arms I', the said guide rollers I being adapted to bear by their own weight on the inner surface of the band with their flanges projecting against each edge or side of the band. The guide roller I can be removed away from the band into an inoperative position by angularly moving the supporting arms I' until they rest against stops I$^2$ on the frame E$^2$. The guide rollers I may be readily removed to enable different diameter rollers or rollers of different widths to be fitted to suit various widths of bands or the said rollers may, as indicated in Fig. 1, be of stepped or coned formation to suit various widths of bands. Means for trimming the edges of the strip during its application to the band may be provided and one arrangement for this purpose is indicated in Fig. 1 by dotted lines. In this case two knives J, J are mounted one on each side of the band to cut the edges of the vulcanite strip after the latter has passed beyond the point of pressure. These knives are shown in the form of short bars but circular knives may be used. Supports or arms J' keyed to a rod J$^2$ carry the knives and the supports may be adjustable along the rod to set the knives in accordance with the width of the band and strip and the rod J$^2$ may be angularly movable in suitable bearings by a crank handle J$^3$ which can be moved through say an angle of 180° to place the knives in an inoperative position. After the strip H has completely encircled the band D the driving or supporting rollers B are unclutched from the driving mechanism and the frame E$^2$ carrying the pressure rollers E is subsequently raised in the manner above described and the guide rollers I are moved out of engagement with the band so that the band D is left free to be removed from the apparatus. While the parts are in this position a fresh band can be inserted in the apparatus. In the case of applying a strip to a band being used for a second time it may be that uneven or untrue surfaces exist on the band and in order that the driving or supporting rollers B may adapt themselves to any such uneven surfaces they may be mounted on spherical surfaces formed on the shafts B' in such a manner that they may slightly rock although they are so attached to the driving pins B as to enable them to be positively driven by the rotation of the said shafts B'.

What we claim and desire to secure by Letters Patent of the United States is:—

1. In an apparatus for the purpose described, the combination of a plurality of rollers adapted to support a tire foundation band, and means for applying pressure to the interior of a band supported by said rollers at points coincident with or adjacent the points of support provided by the supporting rollers.

2. In an apparatus for the purpose described, the combination of a plurality of rollers adapted to support a tire foundation band, a frame adapted to be surrounded by the band and provided with pressure rollers arranged to exert pressure on the inner face of the band at points coincident with or adjacent the points of support provided by the supporting rollers, and means for moving the pressure rollers into and out of contact with the band.

3. In an apparatus for the purpose described, the combination of a plurality of rollers adapted to support a tire foundation band, a frame adapted to be surrounded by the band and provided with pressure rollers arranged to bear against the inner face of the band at points coincident with or adjacent the points of support provided by the supporting rollers, a weighted lever connected to said frame to force the rollers thereon against the band, and means for moving said frame and lever to shift the pressure rollers from the band.

4. In an apparatus for the purpose described, the combination of a plurality of rollers adapted to support a tire foundation band, means for driving said rollers, pressure rolls adapted to exert pressure on the band coincident with or adjacent the points of support provided by the supporting rolls, and means for successively disconnecting the driving means from the supporting rollers and moving the pressure rollers from contact with the band.

5. In an apparatus for the purpose described, the combination of a plurality of rollers adapted to support a tire foundation band, means for driving said rollers including a clutch, means movable to and from position for exerting pressure on the inner face of a band on the supporting and driving rollers, and means whereby said clutch will be moved to disconnect the driving means and supporting rollers before the band can be freed from pressure exerted by the pressure means.

6. In an apparatus for the purpose described, the combination of a plurality of rollers adapted to support a tire foundation band, means for driving said rollers including a clutch, pressure rolls movable to and from engagement with the inner face of a tire band on the supporting rollers, a hand actuated cam for moving the pressure rolls to inoperative position, and means whereby the clutch will be moved to disconnect the driving devices and supporting rolls prior to said cam moving the pressure rollers from the band.

7. In an apparatus for the purpose described, the combination of a plurality of rollers adapted to support a tire foundation band, means for exerting pressure on the inner face of a band supported by said rollers, guiding rollers adapted to extend through a band on the supporting rollers and to engage the edges of a tire strip passing between the supporting rollers and said band, and means for moving said guiding rollers out of engagement with the band.

8. In an apparatus for the purpose described, the combination of a plurality of rollers adapted to support a tire foundation band, a frame adapted to be surrounded by a band supported on said rollers, and provided with pressure rollers arranged to exert pressure on the inner face of a band at points coincident with or adjacent the points of support provided by the supporting rollers, and guide rollers mounted on arms pivotally connected to the frame and adapted to engage a tire strip passing between the foundation band and the supporting rollers.

9. In an apparatus for the purpose described, the combination of a plurality of rollers adapted to support a tire foundation band, means for exerting pressure on the inner face of a band supported by said rollers, and means for trimming the edges of a tire strip passing between the supporting rollers and a foundation band supported thereon.

COLIN MACBETH.
ERNEST SULLIVAN.